(12) United States Patent
Yang et al.

(10) Patent No.: US 10,764,777 B2
(45) Date of Patent: Sep. 1, 2020

(54) METHOD FOR TRANSMITTING AND RECEIVING SIGNALS BY TERMINAL SUPPORTING EN-DC

(71) Applicant: LG Electronics Inc., Seoul (KR)

(72) Inventors: Yoonoh Yang, Seoul (KR); Sangwook Lee, Seoul (KR); Suhwan Lim, Seoul (KR); Manyoung Jung, Seoul (KR); Jinyup Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 21 days.

(21) Appl. No.: 16/271,306

(22) Filed: Feb. 8, 2019

(65) Prior Publication Data

US 2019/0246306 A1    Aug. 8, 2019

Related U.S. Application Data

(60) Provisional application No. 62/628,234, filed on Feb. 8, 2018.

(51) Int. Cl.
*H04W 24/10* (2009.01)
*H04W 72/12* (2009.01)
*H04L 5/00* (2006.01)
*H04L 27/26* (2006.01)

(52) U.S. Cl.
CPC .......... *H04W 24/10* (2013.01); *H04L 5/0007* (2013.01); *H04L 5/0078* (2013.01); *H04L 27/26* (2013.01); *H04W 72/1268* (2013.01)

(58) Field of Classification Search
None
See application file for complete search history.

(56) References Cited

PUBLICATIONS

ZTE: "Further discussion on MGL and MGRP in NR" R4-1713057, 3GPP TSG-RAN WG4 Meeting #85, Reno, USA, Nov. 27-Dec. 1, 2017 (Year: 2017).*
Huawei, HiSilicon: "Further discussion on MGL and MGRP in NR" R4-1711228, 3GPP TSG-RAN WG4 Meeting #84bis, Dubrovnik, Croatia, Oct. 9-13, 2017 (Year: 2017).*
Intel: "On MGRP and MGL for NR" R4-1710367, 3GPP TSG-RAN4 Meeting #84bis, Dubrovnik, Croatia, Oct. 9-13, 2017 (Year: 2017).*

* cited by examiner

*Primary Examiner* — Yaotang Wang
(74) *Attorney, Agent, or Firm* — Fish & Richardson P.C.

(57) ABSTRACT

The present invention discloses a method of transmitting/receiving signals by a terminal supporting EN-DC. The method comprises determining a number of interrupted slots; and transmitting or receiving the signals based on the number of interrupted slots, wherein the signals are not transmitted or received during the interrupted slots, wherein the number of interrupted slots is determined based on SCS of cell supporting the NR, a MG offset, and a MGL, and wherein the number of interrupted slots is 7 when the SCS is 15 kHz, the MG offset is 0.5 ms, and the MGL is 6 ms.

8 Claims, 19 Drawing Sheets

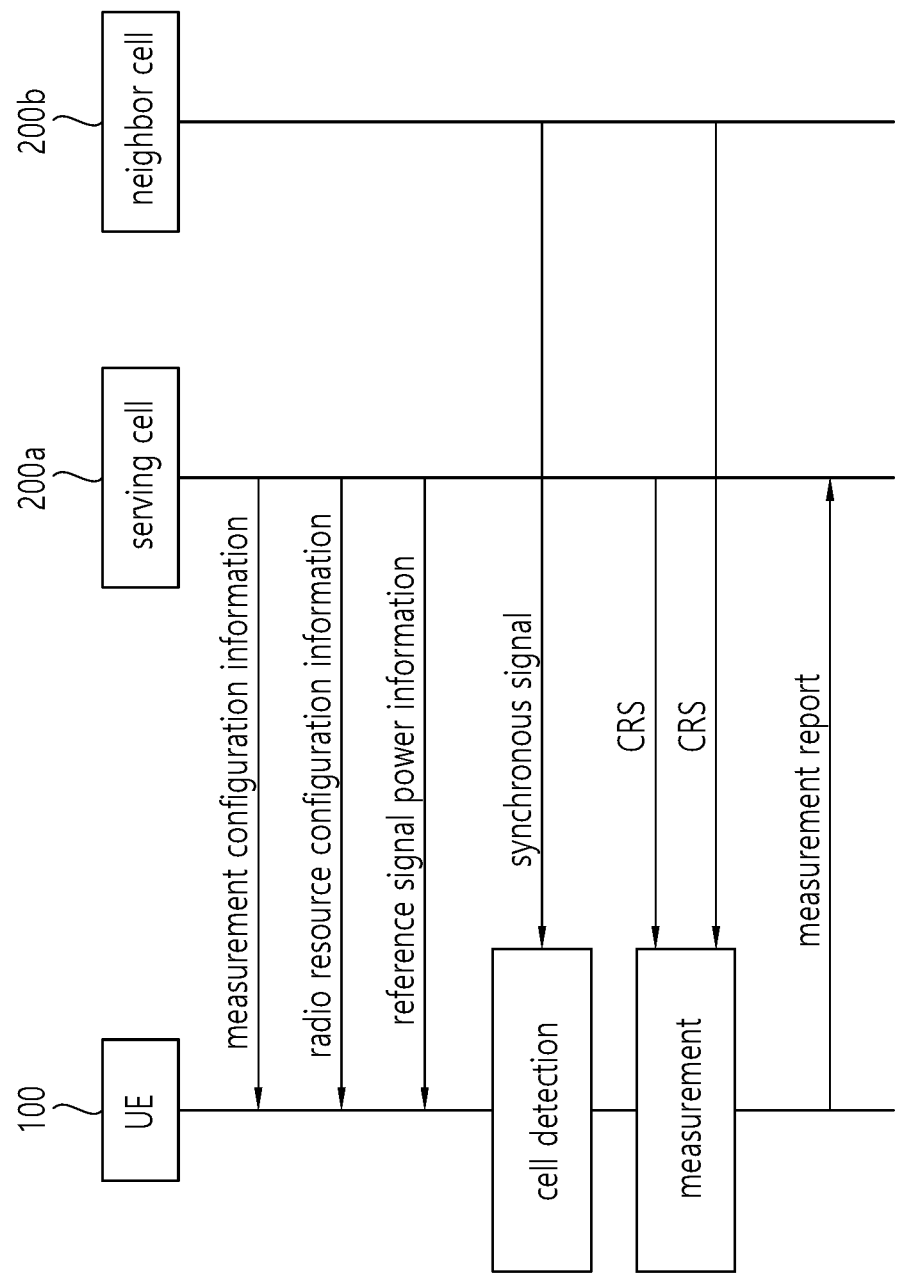

METHOD FOR TRANSMITTING AND RECEIVING SIGNALS BY TERMINAL SUPPORTING EN-DC

CROSS-REFERENCE TO RELATED APPLICATIONS

This application claims the benefit of U.S. Provisional Application No. 62/628,234, filed on Feb. 8, 2018, the contents of which are all hereby incorporated by reference herein in its entirety.

BACKGROUND OF THE INVENTION

Field of the Invention

The present invention relates to mobile communication.

Discussion of the Related Art

With the success of long term evolution (LTE)/LTE-A (LTE-Advanced) for the 4th generation mobile communication, more interest is rising to the next generation, i.e., 5th generation (also known as 5G) mobile communication and extensive research and development are being carried out accordingly.

A new radio access technology (New RAT or NR) has been studied for the fifth generation (so-called 5G) mobile communication.

The NR-based cell may be operated in a standalone (SA), or may be operated in a non-standalone (NSA). According to the NSA, a UE can access a cell based on an E-UTRAN (i.e., LTE/LTE-A) and a cell based on a dual connectivity (DC). This dual connectivity is called EN-DC.

On the other hand, in order to perform measurement on a cell of another RAT, a measurement gap (MG) is required. However, when performing measurement using measurement gap (MG) in EN-DC, interruption for scheduling of serving cell may occur due to MG length (MGL) and MG offset shift.

SUMMARY OF THE INVENTION

Accordingly, a disclosure of the present specification has been made in an effort to solve the aforementioned problem.

Therefore, one disclosure of the present specification is aimed at suggesting a solution to the aforementioned problem.

To achieve the aforementioned purposes of the present invention, one disclosure of the present specification provides a method of transmitting/receiving signals by a terminal supporting E-UTRA (Evolved Universal Terrestrial Radio Access)-NR (New Radio) Dual Connectivity (EN-DC). The method comprises determining a number of interrupted slots; and transmitting or receiving the signals based on the number of interrupted slots, wherein the signals are not transmitted or received during the interrupted slots, wherein the number of interrupted slots is determined based on subcarrier spacing (SCS) of cell supporting the NR, a measurement gap (MG) offset shift, and a MG length (MGL), and wherein the number of interrupted slots is 7 when the SCS is 15 kHz, the MG offset shift is 0.5 ms, and the MGL is 6 ms.

Herein, the number of interrupted slots is 5 when the SCS is 15 kHz, the MG offset shift is 0.5 ms, and the MGL is 4 ms.

Herein, the number of interrupted slots is 4 when the SCS is 15 kHz, the MG offset shift is 0.5 ms, and the MGL is 3 ms.

Herein, the EN-DC is synchronous EN-DC.

To achieve the aforementioned purposes of the present invention, one disclosure of the present specification provides a terminal for transmitting/receiving signals. The terminal supporting E-UTRA (Evolved Universal Terrestrial Radio Access)-NR (New Radio) Dual Connectivity (EN-DC) and comprising: a transceiver configured to transmit or receive the signals; and a processor configured to control the transceiver and determine a number of interrupted slots, wherein the processor controls the transceiver not to transmit or receive the signals during the interrupted slots, wherein the number of interrupted slots is determined based on subcarrier spacing (SCS) of cell supporting the NR, a measurement gap (MG) offset shift, and a MG length (MGL), wherein the number of interrupted slots is 7 when the SCS is 15 kHz, the MG offset shift is 0.5 ms, and the MGL is 6 ms.

According to a disclosure of the present invention, the above problem of the related art is solved.

BRIEF DESCRIPTION OF THE DRAWINGS

FIG. 3 illustrates cell detection and cell measurement procedures.

DETAILED DESCRIPTION OF THE EMBODIMENTS

Figure 1:
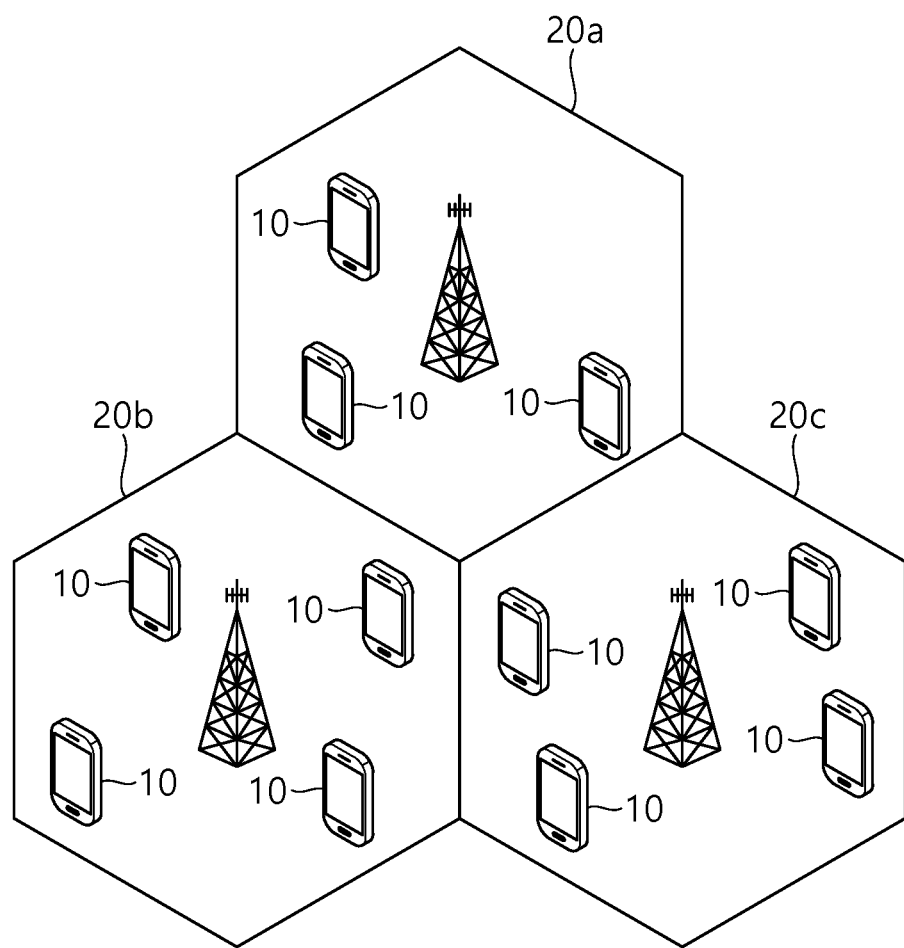
FIG. 1 is a wireless communication system.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Hereinafter, the LTE system will be described in detail.

Figure 2:
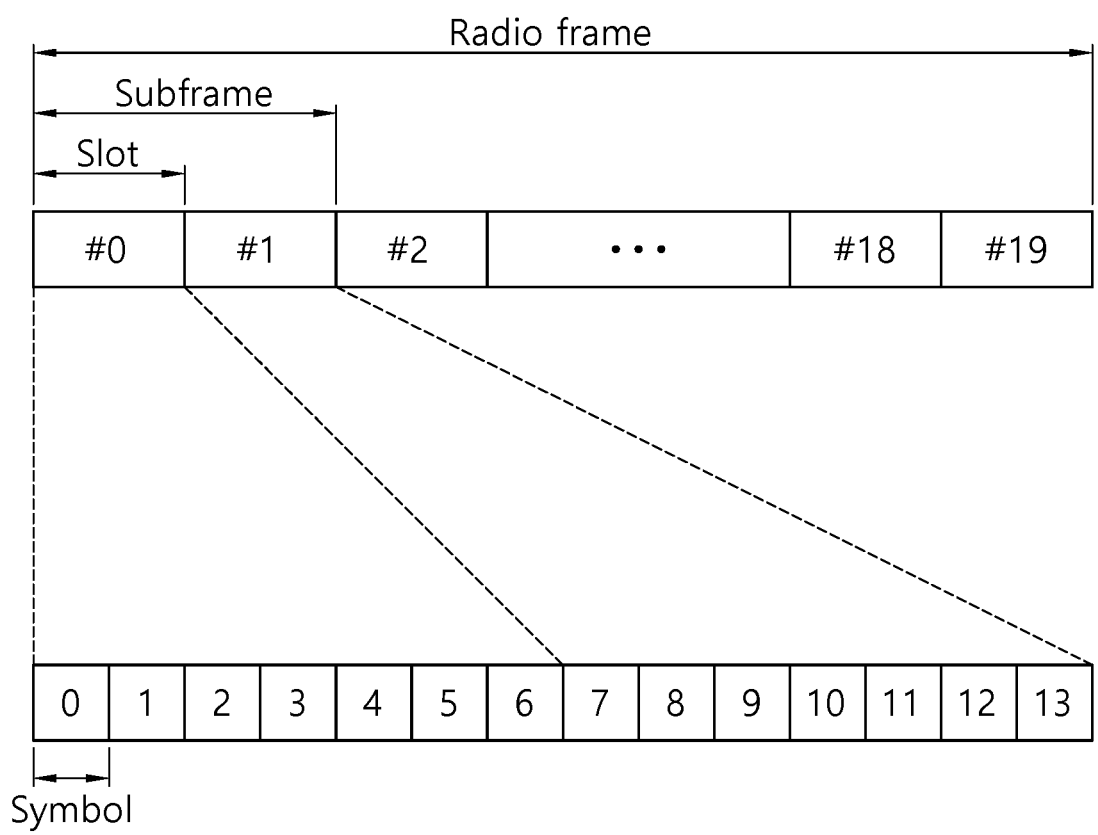
FIG. 2 illustrates a structure of a radio frame according to FDD in 3GPP LTE.

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011 December) "Evolved Universal Terrestrial Radio Access (E-UTRA); Physical Channels and Modulation (Release 10)".

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

One slot includes NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

FIG. 3 illustrates a cell detection and measurement procedure.

Referring to FIG. 3, a UE detects a neighbor cell on the basis of a synchronization signal (SS) transmitted from the neighbor cell. The SS may include a primary synchronization signal (PSS) and a secondary synchronization signal (SSS).

When a serving cell 200a and a neighbor cell 200b each transmit a cell-specific reference signal (CRS) to the UE 100, the UE 100 performs measurement using the CRSs and transmits the measurement result to the serving cell 200a. Here, the UE 100 compares the power levels of the received CRSs on the basis of information about received reference signal power.

Here, the UE 100 may use the following three methods to perform the measurement.

1) Reference signal received power (RSRP): RSRP indicates the average received power of all REs carrying CRSs transmitted over the entire band. Here, the UE may measure the average received power of all REs carrying channel state information (CSI)-RSs instead of CRSs.

2) Received signal strength indicator (RSSI): RSSI indicates received power measured over the entire band. RSSI includes all of a signal, interference, and thermal noise.

3) Reference symbol received quality (RSRQ): RSRQ indicates a CQI and may be determined as RSRP/RSSI depending on a measurement bandwidth or sub-band. That is, RSRQ refers to signal-to-interference-plus-noise-ratio (SINR). Since RSRP does not provide sufficient mobility information, RSRQ may be used instead of RSRP in a handover or cell reselection process.

RSRQ=RSSI/RSSP may be used.

As illustrated, for the measurement, the UE 100 receives a radio resource configuration information element (IE) from the serving cell 100a. The radio resource configuration Dedicated) IE is used to configure/modify/release a radio bearer or to modify an MAC configuration. The radio resource configuration IE includes subframe pattern information. The subframe pattern information is information about a measurement resource restriction pattern on the time domain for measuring RSRP and RSRQ for a serving cell (e.g., primary cell).

For the measurement, the UE 100 receives a measurement configuration (hereinafter, also referred to as 'measconfig') IE from the serving cell 100a. A message including a measurement configuration IE is referred to as a measurement configuration message. Here, the measurement configuration IE may also be received through an RRC connection reconfiguration message. When the measurement result satisfies a report condition in measurement configuration information, the UE reports the measurement result to a base station. A message including a measurement result is referred to as a measurement report message.

The measurement configuration IE may include measurement object information. The measurement object information is information about an object that the UE measures. A measurement object includes at least one of an intra-frequency measurement object as an object of intra-cell measurement, an inter-frequency measurement object as an object of inter-cell measurement, and an inter-RAT measurement object as an object of inter-RAT measurement. For example, the intra-frequency measurement object may indicate a neighbor cell having the same frequency band as that of the serving cell, the inter-frequency measurement object may indicate a neighbor cell having a different frequency band from that of the serving cell, and the inter-RAT measurement object may indicate a neighbor cell having a different RAT from that of the serving cell.

TABLE 1

Description of measurement object field carrierFreq carrierFreq indicates an E-UTRA carrier frequency to which this configuration is applied.
Description of measurement object field
measCycleSCell measCycleSCell indicates a cycle for measurement of a deactivated SCell. This value may be set to 160, 256, or the like. A value of 160 indicates that measurement is performed every 160 subframes.

The measurement configuration IE includes IEs illustrated in the following table.

TABLE 2

Description of MeasConfig field allowInterruptions

A value of True indicates that interruptions to transmission and reception with a serving cell are allowed when a UE performs measurement using MeasCycleScell for carriers for a deactivated SCell.
measGapConfig measGapConfig indicates the configuration or release of a measurement gap.

measGapConfig is used to configure or release a measurement gap (MG).

The measurement gap (MG) is a period for identification and RSRP measurement of a cell on a different frequency (inter-frequency) from that for the serving cell.

TABLE 3

Description of MeasGapConfig field gapOffset

The value of gapOffset may be set to one of gp0, gp1, gp2, and gp3. gp0 corresponds to a gap offset for a pattern ID "0" having MGRP = 40 ms. Gp1 corresponds to a gap offset for a pattern ID "1" having MGRP = 80 ms. gp2 corresponds to a gap offset for a pattern ID "2" having MGRP = 40 ms and MGL = 3 ms. gp3 corresponds to a gap offset for a pattern ID "3" having MGRP = 80 ms and MGL = 3 ms.

TABLE 4

| Gap pattern ID | Measurement gap length (MGL) | Measurement gap repetition period (MGRP) | Minimum time for performing measurement on inter-frequency and inter-RAT for period of 480 ms |
| --- | --- | --- | --- |
| 0 | 6 ms | 40 ms | 60 ms |
| 1 | 6 ms | 80 ms | 30 ms |
| 2 | 3 ms | 40 ms | 24 ms |
| 3 | 3 ms | 80 ms | 12 ms |

If the UE requires a measurement gap for identifying and measuring inter-frequency and inter-RAT cells, the E-UTRAN (i.e., the base station) provides one measurement gap (MG) pattern having a certain gap period.

The UE does not perform any data transmission and reception with the serving cell during the measurement gap period, retunes an RF chain thereof according to an inter-frequency, and performs measurement on the inter-frequency.

<Introduction of Dual Connectivity (DC)>

Recently, studies have been conducted on a method enabling a UE to simultaneously connect to different base stations, for example, a base station of a macrocell and a base station of a small cells. This method is referred to as dual connectivity (DC).

In DC, an eNodeB for a primary cell (PCell) may be referred to as a master eNodeB (hereinafter, referred to as MeNB). An eNodeB only for a secondary cell (SCell) may be referred to as a secondary eNodeB (hereinafter, referred to as SeNB).

A cell group including the primary cell (PCell) by the MeNB may be referred to as a master cell group (MCG) or PUCCH cell group 1, and a cell group including the secondary cell (SCell) by the SeNB may be referred to as a secondary cell group (SCG) or PUCCH cell group 2.

Among secondary cells in the secondary cell group (SCG), a secondary cell where a UE can transmit uplink control information (UCI) or a secondary cell where a UE can transmit a PUCCH may be referred to as a super secondary cell (super SCell) or a primary secondary cell (PSCell).

<Next-Generation Mobile Communication Network>

Due to the success of Long-Term Evolution (LTE)/LTE-Advanced (LTE-A) for fourth-generation mobile communication, there is a growing interest in next-generation mobile communication, that is, fifth-generation (5G) mobile communication, and studies thereon are continuously being conducted.

The International Telecommunication Union (ITU) defines 5G mobile communication as one providing a data transmission speed of up to 20 Gbps and a perceptible transmission speed of at least 100 Mbps or higher anyplace. 5G mobile communication is officially termed IMT-2020 and is expected to be commercialized worldwide toward 2020.

The ITU presents three usage scenarios, for example, enhanced mobile broadband (eMBB), massive machine-type communication (mMTC), and ultra-reliable and low-latency communication (URLLC).

URLLC relates to a usage scenario requiring high reliability and low latency. For example, autonomous driving, factory automation, and augmented reality services require high reliability and low latency (e.g., a delay time of 1 ms or less). Currently, the delay time of 4G (LTE) is statistically 21 to 43 ms (best 10%) and 33 to 75 ms (median). This is insufficient to support a service requiring a delay time of 1 ms or less. Next, the eMBB usage scenario relates to a usage scenario requiring a mobile ultra-wideband.

That is, a 5G generation mobile communication system is aimed at higher capacity than existing 4G LTE, can increase the density of mobile broadband users, and can support device-to-device (D2D), high-stability and machine-type communication (MTC). 5G research and development is also aimed at lower latency and lower battery consumption than a 4G mobile communication system in order to properly implement the Internet of Things. For 5G mobile communication, a new radio access technology (new RAT or NR) may be proposed.

Figure 4A:
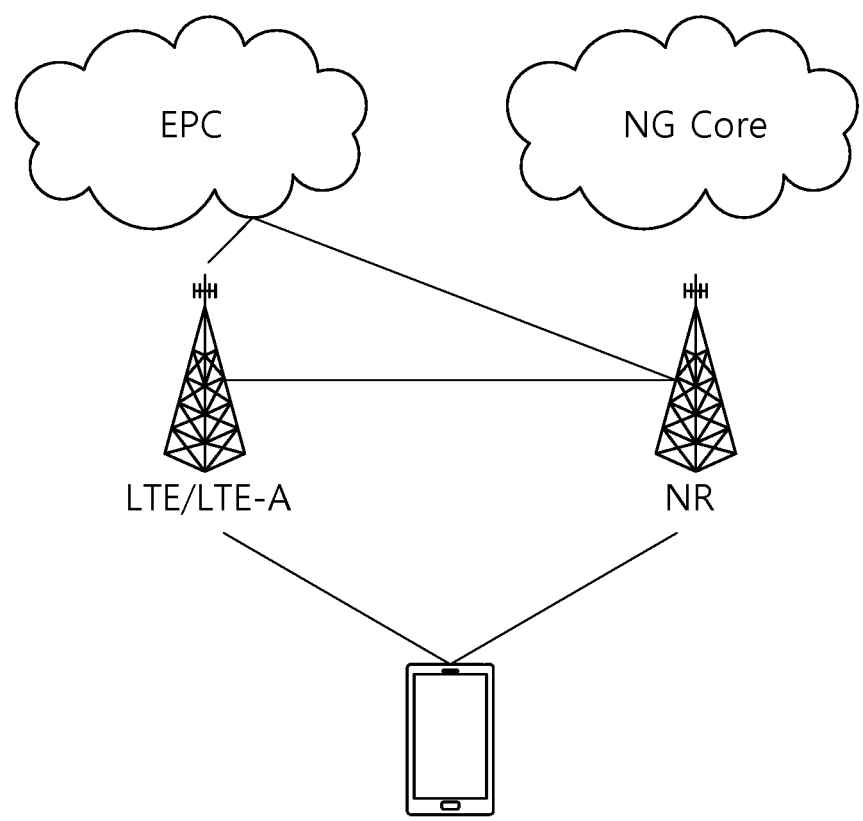
FIGS. 4A-4C illustrate exemplary architecture for the service of the next generation mobile communication.
Figure 4B:
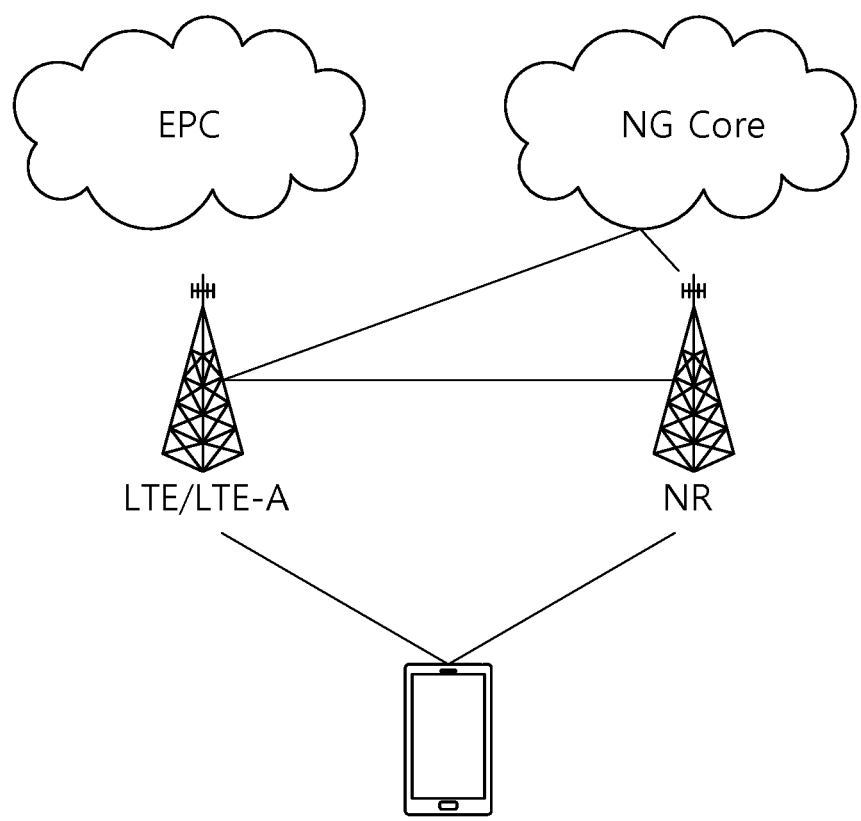
Figure 4C:
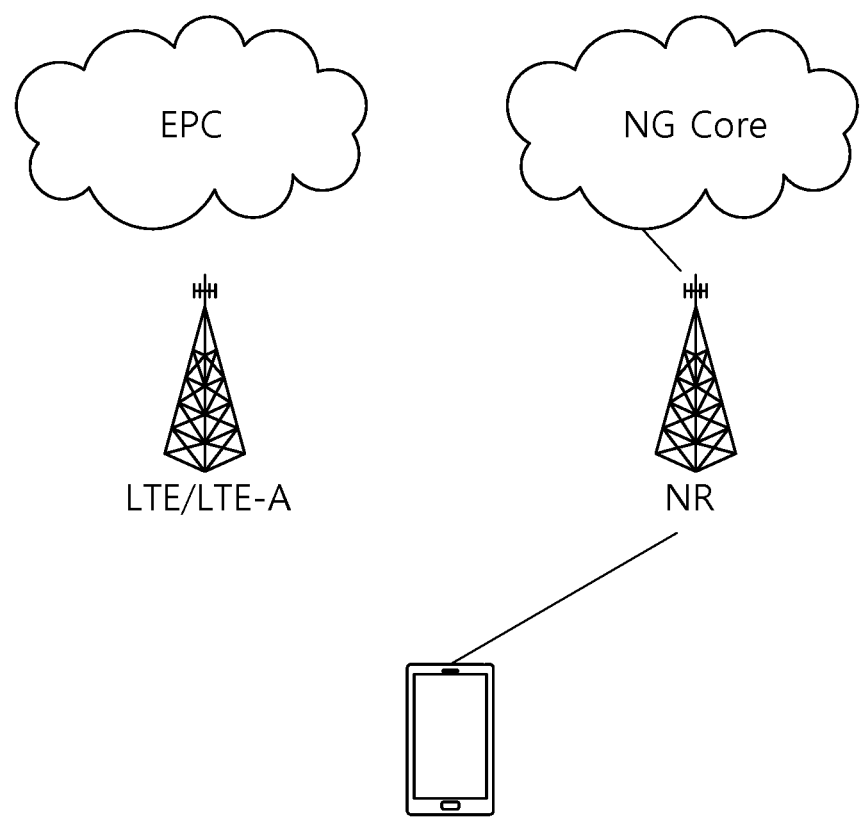

FIGS. 4A to 4C show illustrative architecture for a next-generation mobile communication service.

Referring to FIG. 4A, a UE is connected to an LTE/LTE-A-based cell and an NR-based cell in a dual connectivity (DC) manner.

The NR-based cell is connected to a core network for existing 4G mobile communication, that is, an evolved packet core (EPC).

Referring to FIG. 4B, unlike in FIG. 4A, an LTE/LTE-A-based cell is connected to a core network for 5G mobile communication, that is, a next-generation (NG) core network.

A service method based on the architectures illustrated in FIGS. 4A and 4B is referred to as a non-standalone (NSA) scheme.

Referring to FIG. 4C, a UE is connected only to an NR-based cell. A service method based on this architecture is referred to as a standalone (SA) scheme.

In NR, it may be considered to use a downlink subframe for reception from a base station and to use an uplink subframe for transmission to the base station. This method may be applied to paired spectra and unpaired spectra. A pair of spectra means that two carrier spectra are included for downlink and uplink operations. For example, in a pair of spectra, one carrier may include a downlink band and an uplink band that are paired.

Figure 5:
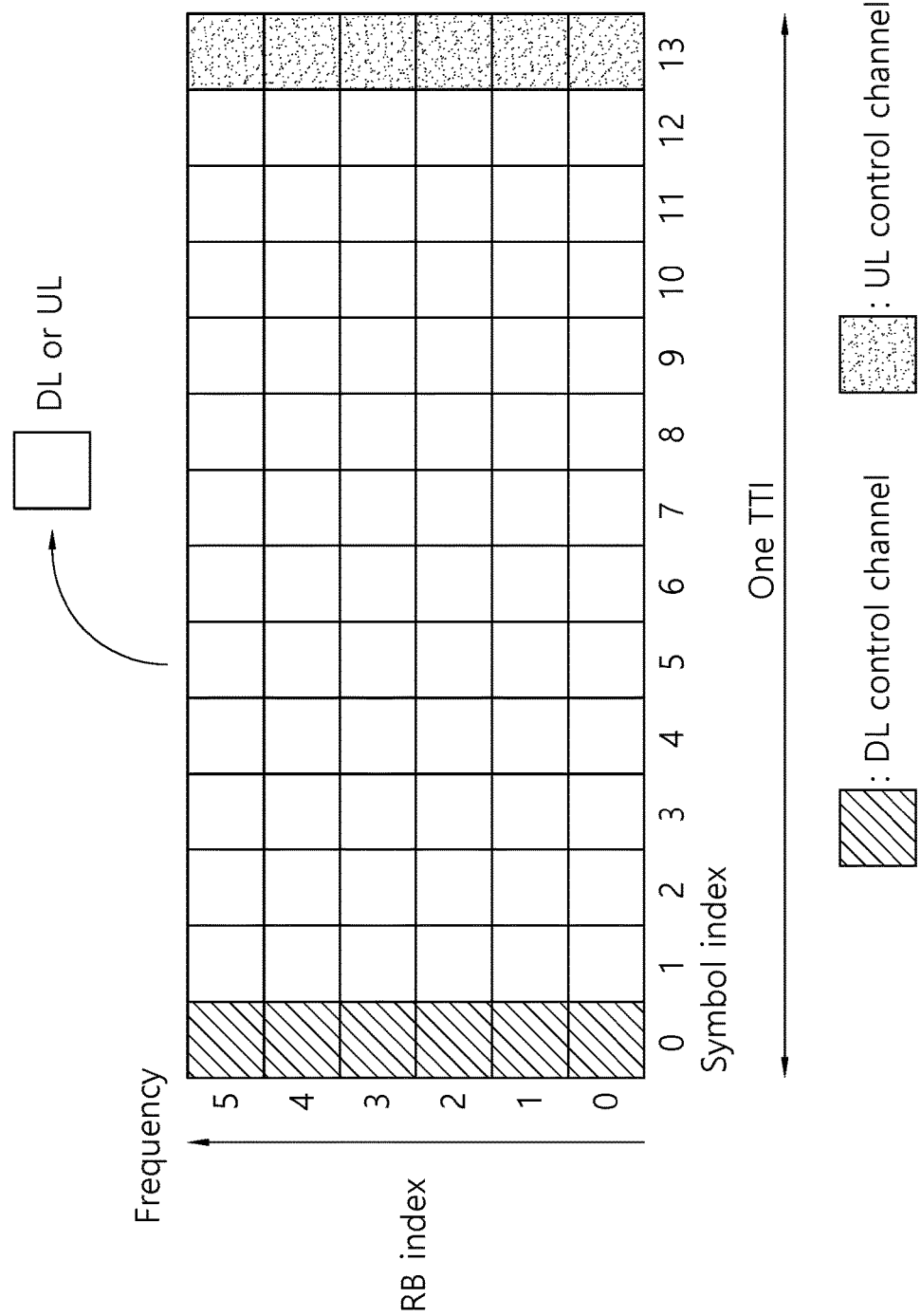
FIG. 5 illustrates an example of a subframe type in NR.

FIG. 5 shows an example of a subframe type in NR.

A transmission time interval (TTI) of FIG. 5 may be referred to as a subframe or slot for NR (or new RAT). A subframe (or slot) of FIG. 5 may be used in a TDD system of NR (or new RAT) to minimize data transmission latency. As shown in FIG. 5, the subframe (or slot) includes 14 symbols, similarly to the current subframe. A front portion symbol of the subframe (or slot) may be used for a DL control channel, and an end portion symbol of the subframe (or slot) may be used for a UL control channel. The remaining symbols may be used for DL data transmission or UL data transmission. According to such a subframe (or slot) structure, DL transmission and UL transmission may be sequentially performed in one subframe (or slot). Accordingly, DL data may be received within the subframe (or slot), and a UL acknowledgement (ACK/NACK) may be transmitted within the subframe (or slot). The subframe (or slot) structure may be referred to as a self-contained subframe (or slot). The use of the subframe (or slot) structure has an advantage in that a time required to transmit data which has been erroneously received is reduced, thereby minimizing a final data transmission latency. In the self-contained subframe (or slot) structure, a time gap may be required in a process of transitioning from a transmission mode to a reception mode or from the reception mode to the transmission mode. For this, some OFDM symbols may be set to a guard period (GP) when switching from DL to UL in the subframe structure.

Figure 6:
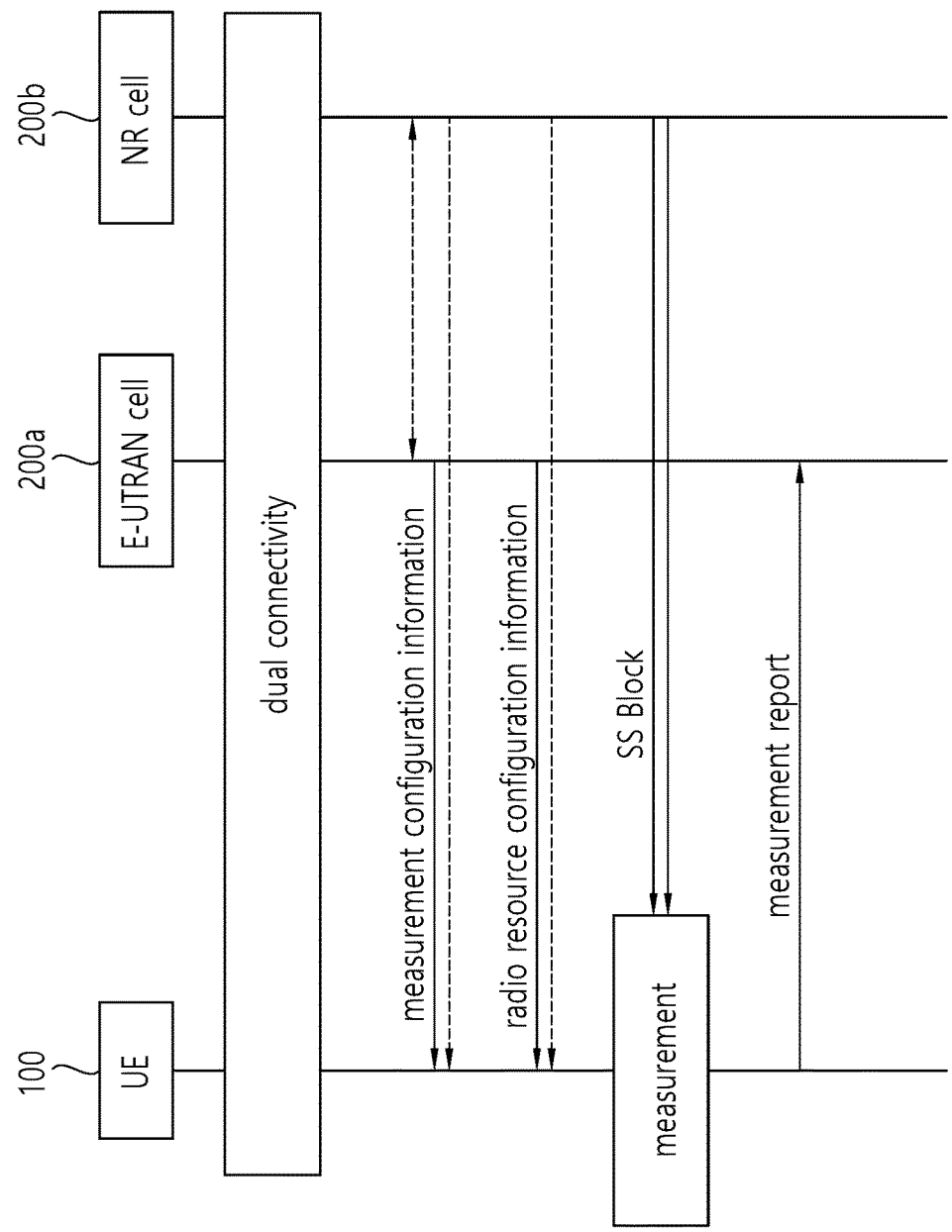
FIG. 6 illustrates example of performing measurements in the EN-DC.

FIG. 6 shows an example of performing measurements in E-UTRAN and NR (EN) DC.

Referring to FIG. 6, a UE 100 is connected to an E-UTRAN (i.e., LTE/LTE-A) cell and an NR cell in an EN-DC manner. Here, a PCell in the DC is the E-UTRAN (i.e., LTE/LTE-A) cell, and a PSCell in the DC may be the NR cell.

The UE 100 may receive a measurement configuration (also referred to as 'measconfig') IE of the E-UTRAN (i.e., LTE/LTE-A) cell that is the PCell. The measurement configuration ('measconfig') IE received from the E-UTRAN (i.e., LTE/LTE-A) cell may further include fields illustrated in the following table in addition to those illustrated in Table 2.

TABLE 5

| Description of MeasConfig field |
| --- |
| fr1-Gap |
| This field is included when a UE is configured in EN-DC. This field indicates whether a gap is applied for measurement on an FR1 band (illustrated in Table 9). |
| mgta |
| This field indicates whether to apply a timing advance (TA) of 0.5 ms to a measurement gap configuration provided by an E-UTRAN. |

The measurement configuration ('measconfig') IE may further include a measGapConfig field for configuring a measurement gap (MG), as illustrated in Table 2.

A gapoffset field in the measGapConfig field may further include gp4, gp5, . . . , and gp11 for EN-DC in addition to those illustrated in Table 3.

The UE 100 may receive a measurement configuration ('measconfig') IE of the NR cell as the PSCell directly from the NR cell or via the E-UTRAN cell as the PCell.

The measurement configuration ('measconfig') IE of the NR cell may include fields illustrated in the following table.

TABLE 6

Description of MeasConfig field measGapConfig

This field indicates the configuration or release of a measurement gap
s-MeasureConfig This field indicates a threshold value for NR SpCell RSRP measurement when a UE needs to perform measurement in a non-serving cell.

measGapConfig may include fields illustrated in the following table.

TABLE 7

Description of MeasGapConfig field gapFR2

This field indicates a measurement gap configuration applicable to in a frequency range of FR2.
gapOffset This field indicates a gap offset of a gap pattern along with an MGRP.
mgl This field indicates a measurement gap length in ms, which may be, for example, 3 ms, 4 ms, 6 ms, or the like.
mgrp This field indicates a measurement gap repetition period in ms.
mgta This field indicates whether to apply a timing advance (TA) of 0.5 ms to a measurement gap configuration.

As illustrated, the UE 100 receives a radio resource configuration IE of the E-UTRAN (i.e., LTE/LTE-A) cell as the PCell. Further, the UE 100 may receive a radio resource configuration IE of the NR cell as the PSCell from the NR cell or via the E-UTRAN as the PCell. As described with reference to FIG. 3, the radio resource configuration IE includes subframe pattern information.

The UE 100 performs measurement and reports the measurement result. Specifically, the UE 100 interrupts data transmission and reception with the E-UTRAN (i.e., LTE/LTE-A) cell as the PCell during the measurement gap period, retunes an RF chain thereof, and performs measurement on the basis of an SS block received from the NR cell.

Meanwhile, when performing measurement using measurement gap (MG) in LTE-NR dual connectivity, interruption for scheduling of serving cell may occur according to MG length (MGL) and MG offset shift.

The present invention proposes the number of interrupted slots that do not transmit and receive data according to the interruption, and proposes behaviors of the terminal in the case.

According to the present invention, since the terminal solves the interruption, there is an effect that the base station does not need to perform processing such as resource change according to the interruption.

DISCLOSURE OF THE PRESENT INVENTION

For inter-RAT new radio (NR) measurement or inter-frequency NR measurement or intra-frequency NR measurement which synchronization signal block (SSB) is outside of bandwidth part (BWP) of serving cell, per-UE MG or per-frequency region (FR) measurement gap is required depending on UE capability. And SS/PBCH block measurement time configuration (SMTC) is also configured for the measurement. The MGL was defined with 6 ms, 4 ms, 3 ms, 5.5 ms, 3.5 ms and 1.5 ms in RAN4. And SMTC window duration was defined with 1 ms, 2 ms, 3 ms, 4 ms and 5 ms in RAN1.

In general, MG is expected to be configured to cover SMTC window duration. However, in case that SMTC starting time is aligned with MG starting time, some beginning SSBs could be missed due to RF retuning time such as 0.5 ms for FR1 and 0.25 ms for FR2. In order to avoid the missed SSB due to RF retuning, longer MGL than SMTC window duration should be configured with at least 1 ms earlier MG starting time than SMTC starting time. By the reason, RAN4 discussed the measurement gap offset shift for efficient MG configuration in aspect of serving cell scheduling and made consensus to define signaling to advance MG starting time with MG offset shift of 0.5 ms for FR1 and 0.25 ms for FR2. Due to the advanced MG starting time of 0.5 ms or 0.25 ms, interrupted subframe or slot can be different comparing with legacy MG, so it needs to be noticed obviously in RRM specification.

For FR1 example, we assume that MGL=4 ms, MG offset='i' ms, SMTC window duration=3 ms and NW configures same offset for MG and SMTC for NR subcarrier spacing (SCS) of 15 kHz, 30 kHz and 60 kHz as FIG. 2-1. Here, RF tuning of 0.5 ms is considered regarding current MG applicability.

Figure 7:
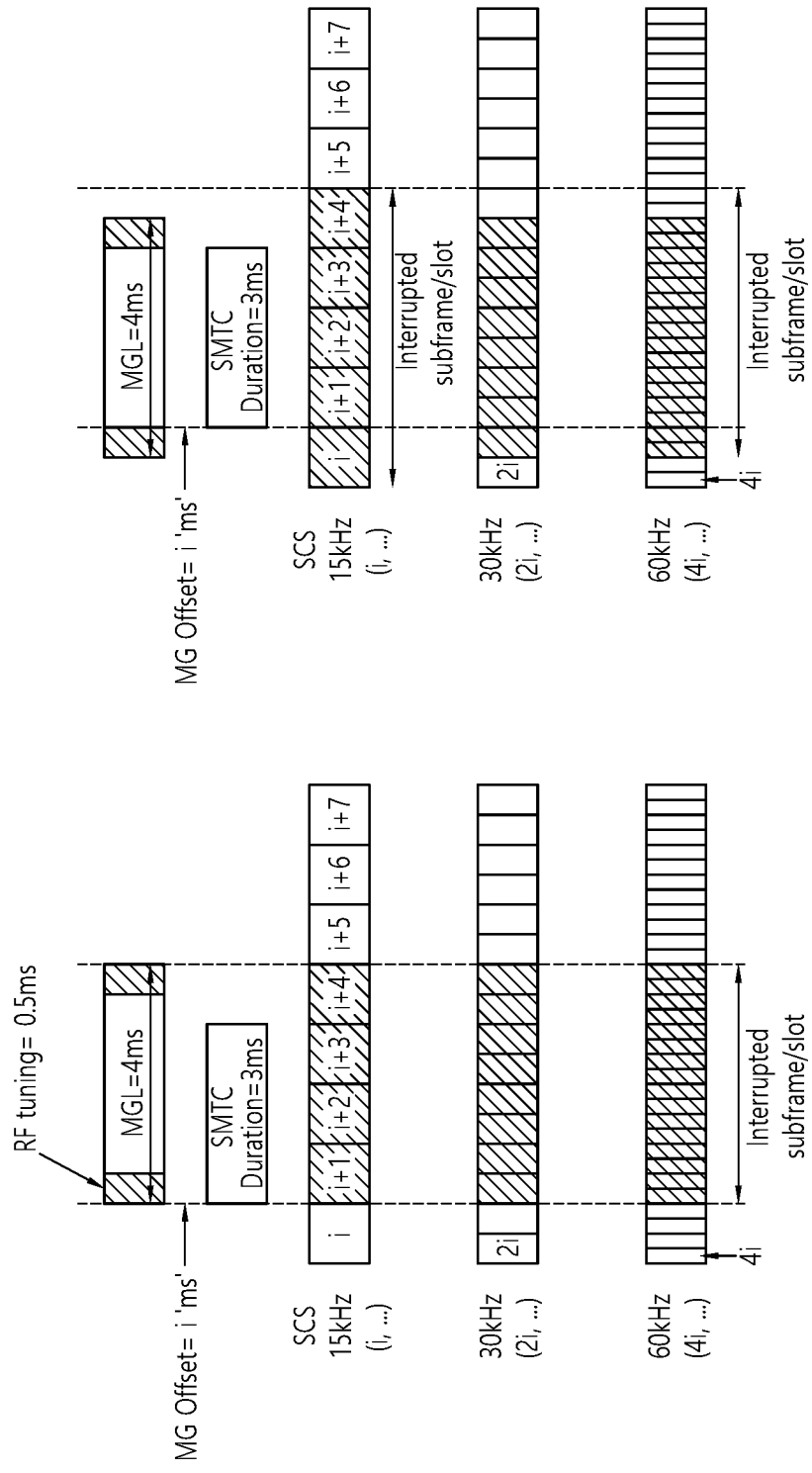
FIG. 7 illustrates interrupted slots for FR1 SCS due to MG.

FIG. 7 illustrates interrupted slots for FR1 SCS due to MG.

Figure 9:
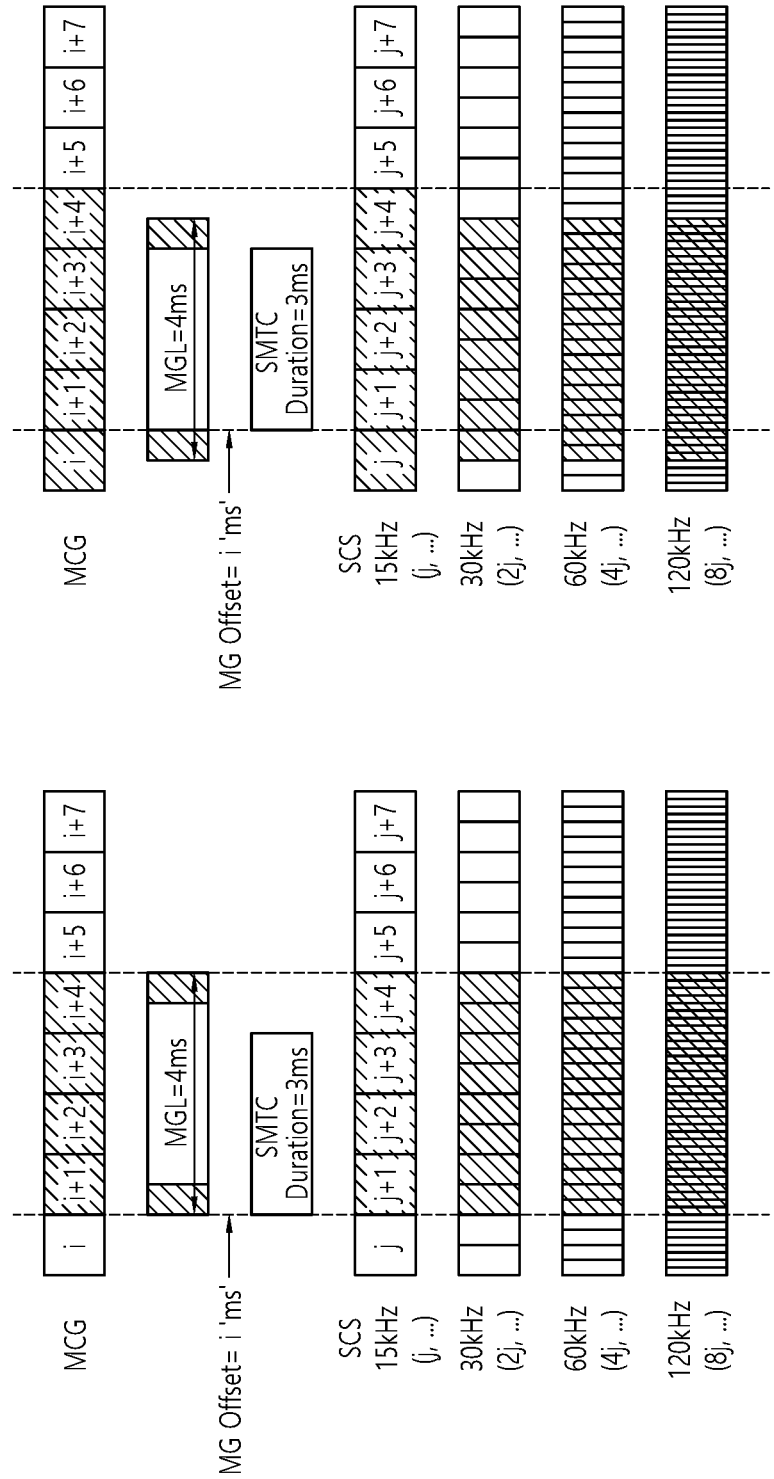
FIG. 9 illustrates interrupted slots on MCG and SCG during MGL for synchronous EN-DC.

(a) of FIG. 7 illustrates interrupted slots with MG offset shift (equal to mgta) of 0 ms. And (b) of FIG. 9 illustrates interrupted slots with MG offset shift of 0.5 ms.

Referring to FIG. 7, it is expected that total 4 subframes or slots are interrupted during MGL in case of MG offset shift of 0 ms and total 5 subframes or slots are interrupted during MGL in case of MG offset shift of 0.5 ms for SCS of 15 kHz. For SCS of 30 kHz, total 8 subframes or slots are interrupted during MGL of 4 ms in both cases of MG offset shift of 0 ms and 0.5 ms. For SCS of 60 kHz, total 16 subframes or slots are interrupted during MGL of 4 ms in both cases of MG offset shift of 0 ms and 0.5 ms.

Figure 8A:
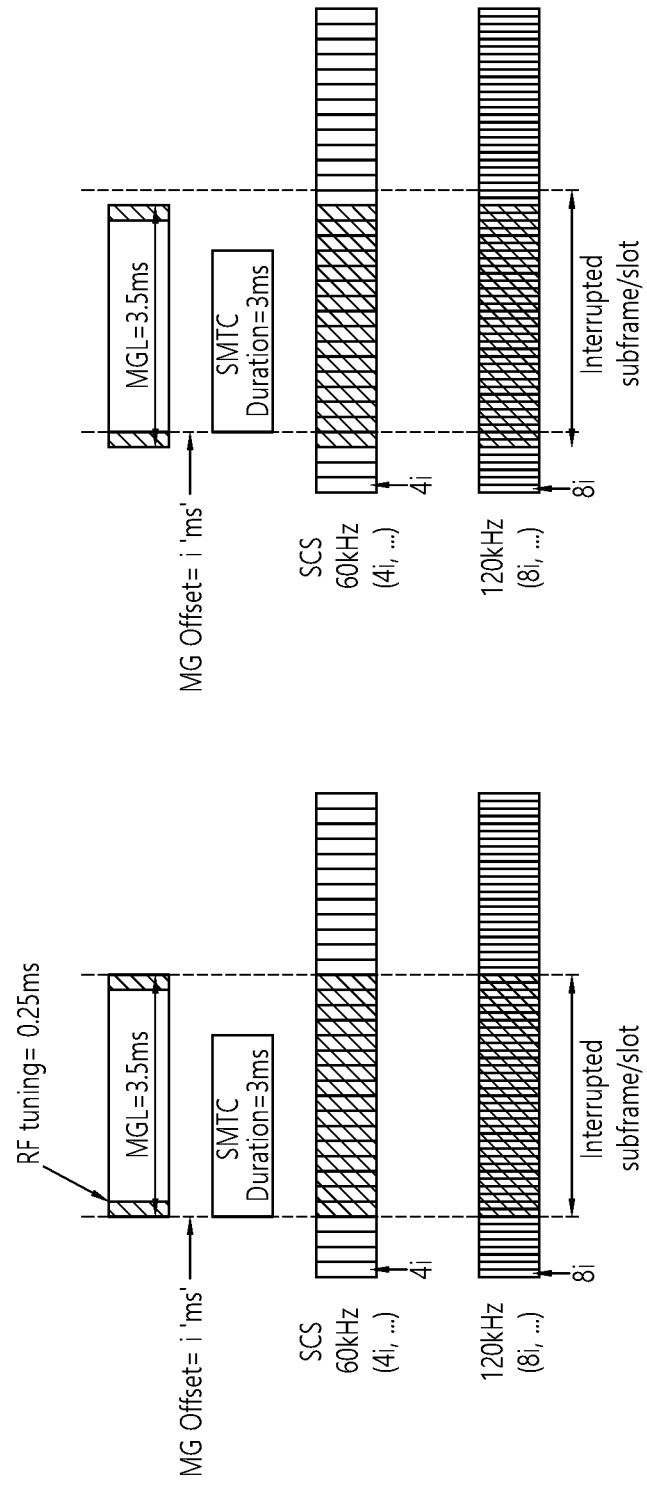
FIG. 8A and FIG. 8B illustrate interrupted slots for FR2 SCS due to MG.
Figure 8B:
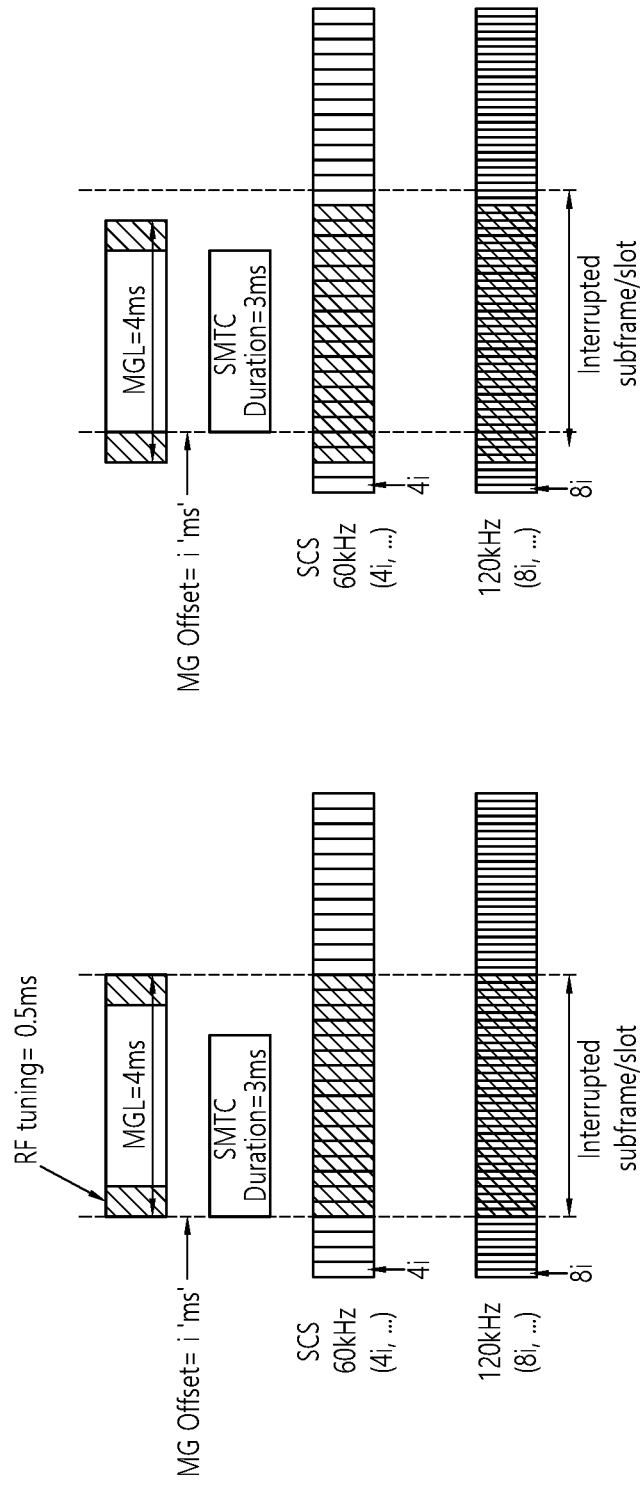

FIG. 8A and FIG. 8B illustrate interrupted slots for FR2 SCS due to MG.

(a) of FIG. 8A illustrates interrupted slots with MG offset shift of 0 ms in FR2 serving cell. And (b) of FIG. 8B illustrates interrupted slots with MG offset shift of 0.25 ms in FR2 serving cell.

(a) of FIG. 8B illustrates interrupted slots with MG offset shift of 0 ms in E-UTRA/FR1 serving cell. And (b) of FIG. 8B illustrates interrupted slots with MG offset shift of 0.5 ms in E-UTRA/FR1 serving cell.

For FR2 example, two cases can be considered. First case is that serving cell is FR2 and second case is that serving cell is E-UTRA or FR1. The first case is illustrated in FIG. 8A, and the second case is illustrated in FIG. 8B.

Referring to FIG. 8A, for FR2 serving cell, we assume MGL=3.5 ms, MG offset='i' ms, SMTC window duration=3 ms and RF retuning=0.25 ms. And referring to FIG. 8B, for E-UTRA/FR1 serving cell, we assume that MGL=4 ms, MG offset='i' ms, SMTC window duration=3 ms and RF retuning=0.5 ms. Here, network (NW) is also assumed to configure same offset for MG and SMTC.

Based on the examples, the total number of interrupted subframe or slot can be summarized generally according to MG offset shift as following tables.

TABLE 8

| Serving Cell | NR SCS (kHz) | Total number of interrupted subframe (E-UTRA) | | | | | |
|---|---|---|---|---|---|---|---|
| | | MG offset shift = 0 ms | | | MG offset shift = 0.5 ms | | |
| | | MGL = 6 ms | MGL = 4 ms | MGL = 3 ms | MGL = 6 ms | MGL = 4 ms | MGL = 3 ms |
| E-UTRA | 15 | 6 | 4 | 3 | 7 | 5 | 4 |
| | 30 | 6 | 4 | 3 | 7 | 5 | 4 |
| | 60 | 6 | 4 | 3 | 7 | 5 | 4 |
| | 120 | 6 | 4 | 3 | 7 | 5 | 4 |

TABLE 9

| Serving Cell | NR SCS (kHz) | Total number of interrupted slot (NR(FR1)) | | | | | |
|---|---|---|---|---|---|---|---|
| | | MG offset shift = 0 ms | | | MG offset shift = 0.5 ms | | |
| | | MGL = 6 ms | MGL = 4 ms | MGL = 3 ms | MGL = 6 ms | MGL = 4 ms | MGL = 3 ms |
| E-UTRA or NR FR1 | 15 | 6 | 4 | 3 | 7 | 5 | 4 |
| | 30 | 12 | 8 | 6 | 12 | 8 | 6 |
| | 60 | 24 | 16 | 12 | 24 | 16 | 12 |

TABLE 10

| Serving Cell | NR SCS (kHz) | Total number of interrupted slot (NR(FR2)) | | | | | |
|---|---|---|---|---|---|---|---|
| | | MG offset shift = 0 ms | | | MG offset shift = 0.25 ms | | |
| | | MGL = 6 ms | MGL = 4 ms | MGL = 3 ms | MGL = 6 ms | MGL = 4 ms | MGL = 3 ms |
| E-UTRA or NR FR1 | 60 | 24 | 16 | 12 | 24 | 16 | 12 |
| | 120 | 48 | 32 | 24 | 48 | 32 | 24 |
| | | MGL = 5.5 ms | MGL = 3.5 ms | MGL = 1.5 ms | MGL = 5.5 ms | MGL = 3.5 ms | MGL = 1.5 ms |
| NR FR2 | 60 | 22 | 14 | 6 | 22 | 14 | 6 |
| | 120 | 44 | 28 | 12 | 44 | 28 | 12 |

In Table 8, Table 9 and Table 10, the interrupted staring time and the interrupted ending time depends on practically applied MG with MG offset shift at UE.

In other words, when MG is configured with MG offset of 'i' ms and MGL of 'N' ms as shown in FIG. 7, FIG. 8A and FIG. 8B, the interrupted time duration may be defined as follows.

1) MG offset shift is 0 ms for MGL (N) of 6 ms, 4 ms and 3 ms.
   interrupted time duration on E-UTRA serving cell is from 'i+1' to 'i+N' for all NR SCSs
   interrupted time duration on NR FR1 serving cell is from 'i+1' to 'i+N' for NR SCS of 15 kHz
   interrupted time duration on NR FR1 serving cell is from '2(i+1)' to '2(i+N+1)−1' for NR SCS of 30 kHz
   interrupted time duration on NR FR1 serving cell is from '4(i+1)' to '4(i+N+1)−1' for NR SCS of 60 kHz
   interrupted time duration on NR FR2 serving cell is from '4(i+1)' to '4(i+N+1)−1' for NR SCS of 60 kHz
   interrupted time duration on NR FR2 serving cell is from '8(i+1)' to '8(i+N+1)−1' for NR SCS of 120 kHz 2) MG offset shift is 0.5 ms for MGL (N) of 6 ms, 4 ms and 3 ms.
   interrupted time duration on E-UTRA serving cell is from 'i' to 'i+N' for all NR SCSs
   interrupted time duration on NR FR1 serving cell is from 'i' to 'i+N' for NR SCS of 15 kHz
   interrupted time duration on NR FR1 serving cell is from '2(i+1)−1' to '2(i+N)' for NR SCS of 30 kHz
   interrupted time duration on NR FR1 serving cell is from '4(i+1)−2' to '4(i+N)+1' for NR SCS of 60 kHz
   interrupted time duration on NR FR2 serving cell is from '4(i+1)−2' to '4(i+N)+1' for NR SCS of 60 kHz
   interrupted time duration on NR FR2 serving cell is from '8(i+1)−4' to '8(i+N)+3' for NR SCS of 120 kHz 3) MG offset shift is 0 ms for MGL (N) of 5.5 ms, 3.5 ms and 1.5 ms.
   interrupted time duration on NR FR2 serving cell is from '4(i+1)' to '4(i+ceiling(N))+1' for NR SCS of 60 kHz
   interrupted time duration on NR FR2 serving cell is from '8(i+1)' to '8(i+ceiling(N))+3' for NR SCS of 120 kHz 4) MG offset shift is 0.25 ms for MGL (N) of 5.5 ms, 3.5 ms and 1.5 ms.
   interrupted time duration on NR FR2 serving cell is from '4(i+1)−1' to '4(i+ceiling(N))' for NR SCS of 60 kHz
   interrupted time duration on NR FR2 serving cell is from '8(i+1)−2' to '8(i+ceiling(N))+1' for NR SCS of 120 kHz During the interrupted time duration, UE is not expected to transmit or receive any data from serving cell.

Figure 10:
FIG. 10 illustrates interrupted slots on MCG and SCG during MGL for asynchronous EN-DC.

FIG. 9 illustrates interrupted slots on MCG and SCG during MGL for synchronous EN-DC, and FIG. 10 illustrates interrupted slots on MCG and SCG during MGL for asynchronous EN-DC.

Left side of FIG. 9 illustrates interrupted slots with MG offset shift of 0 ms for synchronous EN-DC, and right side of FIG. 9 illustrates interrupted slots with MG offset shift of 0.5 ms for synchronous EN-DC.

Left side of FIG. 10 illustrates interrupted slots with MG offset shift of 0 ms for asynchronous EN-DC, and right side of FIG. 10 illustrates interrupted slots with MG offset shift of 0.5 ms for asynchronous EN-DC.

For EN-DC case, if UE is not capable of per-FR gap, interruption can occur on SCG in addition to MCG during MGL which is configured from E-UTRA serving cell. It should be identified for synchronous or asynchronous operation regarding MG offset shift together.

Referring to FIG. 9 and FIG. 10, for EN-DC example, we assume that MGL=4 ms, SMTC window duration=3 ms and NW configures same offset for MG and SMTC for NR subcarrier spacing (SCS) of 15 kHz, 30 kHz, 60 kHz and 120 kHz. Here, RF tuning of 0.5 ms is considered regarding current MG applicability.

Based on the examples, the total interrupted slot on NR SCG can be summarized generally according to MG offset shift as Table 11 and Table 12 for synchronous EN-DC and asynchronous EN-DC respectively.

TABLE 11

| Serving Cell | NR SCS (kHz) | Total number of interrupted slot on SCG | | | | | |
|---|---|---|---|---|---|---|---|
| | | MG offset shift = 0 ms | | | MG offset shift = 0.5 ms | | |
| | | MGL = 6 ms | MGL = 4 ms | MGL = 3 ms | MGL = 6 ms | MGL = 4 ms | MGL = 3 ms |
| E-UTRA | 15 | 6 | 4 | 3 | 7 | 5 | 4 |
| | 30 | 12 | 8 | 6 | 12 | 8 | 6 |
| | 60 | 24 | 16 | 12 | 24 | 16 | 12 |
| | 120 | 48 | 32 | 24 | 48 | 32 | 24 |

TABLE 12

| Serving Cell | NR SCS (kHz) | Total number of interrupted slot on SCG | | | | | |
|---|---|---|---|---|---|---|---|
| | | MG offset shift = 0 ms | | | MG offset shift = 0.5 ms | | |
| | | MGL = 6 ms | MGL = 4 ms | MGL = 3 ms | MGL = 6 ms | MGL = 4 ms | MGL = 3 ms |
| E-UTRA | 15 | 7 | 5 | 4 | 6 | 4 | 3 |
| | 30 | 12 | 8 | 6 | 12 | 8 | 6 |
| | 60 | 24 | 16 | 12 | 24 | 16 | 12 |
| | 120 | 48 | 32 | 24 | 48 | 32 | 24 |

In Table 11 and Table 12, interrupted staring time and interrupted ending time depends on practically applied MG with MG offset shift at UE.

In other words, when MG is configured with MG offset of 'i' ms and MGL of 'N' ms from E-UTRA PCell as shown in FIG. 9 and FIG. 10, the interrupted time duration may be defined as follows.

First, Synchronous EN-DC case as shown in FIG. 9.
1) MG offset shift is 0 ms for MGL (N) of 6 ms, 4 ms and 3 ms
  interrupted time duration on E-UTRA MCG is from 'i+1' to 'i+N' for all NR SCSs
  interrupted time duration on NR SCG is from 'j+1' to 'j+N' for NR SCS of 15 kHz
  interrupted time duration on NR SCG is from '2(j+1)' to '2(j+N+1)−1' for NR SCS of 30 kHz
  interrupted time duration on NR SCG is from '4(j+1)' to '4(j+N+1)−1' for NR SCS of 60 kHz
  interrupted time duration on NR SCG is from '8(j+1)' to '8(j+N+1)−1' for NR SCS of 120 kHz
2) MG offset shift is 0.5 ms for MGL (N) of 6 ms, 4 ms and 3 ms.
  interrupted time duration on E-UTRA MCG is from 'i' to 'i+N' for all NR SCS
  interrupted time duration on NR SCG is from 'j' to 'j+N' for NR SCS of 15 kHz
  interrupted time duration on NR SCG is from '2(j+1)−1' to '2(j+N)' for NR SCS of 30 kHz
  interrupted time duration on NR SCG is from '4(j+1)−2' to '4(j+N)+1' for NR SCS of 60 kHz
  interrupted time duration on NR SCG is from '8(j+1)−4' to '8(j+N)+3' for NR SCS of 120 kHz Second, Asynchronous EN-DC case as shown in FIG. 10
1) MG offset shift is 0 ms for MGL(N) of 6 ms, 4 ms and 3 ms
  interrupted time duration on E-UTRA MCG is from 'i+1' to 'i+N' for all NR SCSs
  interrupted time duration on NR SCG is from 'j+1' to 'j+N+1' for NR SCS of 15 kHz
  interrupted time duration on NR SCG is from '2(j+1)+1' to '2(j+N+1)' for NR SCS of 30 kHz
  interrupted time duration on NR SCG is from '4(j+1)+2' to '4(j+N+1)+1' for NR SCS of 60 kHz
  interrupted time duration on NR SCG is from '8(j+1)+4' to '8(j+N+1)+3' for NR SCS of 120 kHz
2) MG offset shift is 0.5 ms for MGL(N) of 6 ms, 4 ms and 3 ms
  interrupted time duration on E-UTRA MCG is from 'i' to 'i+N' for all NR SCS
  interrupted time duration on NR SCG is from 'j+1' to 'j+N' for NR SCS of 15 kHz
  interrupted time duration on NR SCG is from '2(j+1)' to '2(j+N+1)−1' for NR SCS of 30 kHz
  interrupted time duration on NR SCG is from '4(j+1)' to '4(j+N+1)−1' for NR SCS of 60 kHz interrupted time duration on NR SCG is from '8(j+1)' to '8(j+N+1)−1' for NR SCS of 120 kHz During the interrupted time duration, UE is not expected to transmit or receive any data from serving cell(s) on MCG and SCG.

Based on the analysis, we propose as follows.

Proposal 1: RAN4 should specify the total interrupted number of subframe for master cell group (MCG) and/or the total interrupted number of slot for secondary cell group (SCG), and corresponding subframe slot on serving cell(s) regarding MGL and MG offset shift.

Proposal 2: RAN4 should specify the total interrupted number of subframe for MCG and the total interrupted number of slot for SCG, and corresponding slot on serving cell(s) in EN-DC regarding MGL and MG offset shift.

Proposal 3: RAN4 should specify that UE is not expected to transmit or receive any data on serving cell(s) at subframe(s) or slot(s) which is overlapped with duration of MGL regarding MG offset shift.

Figure 11A:
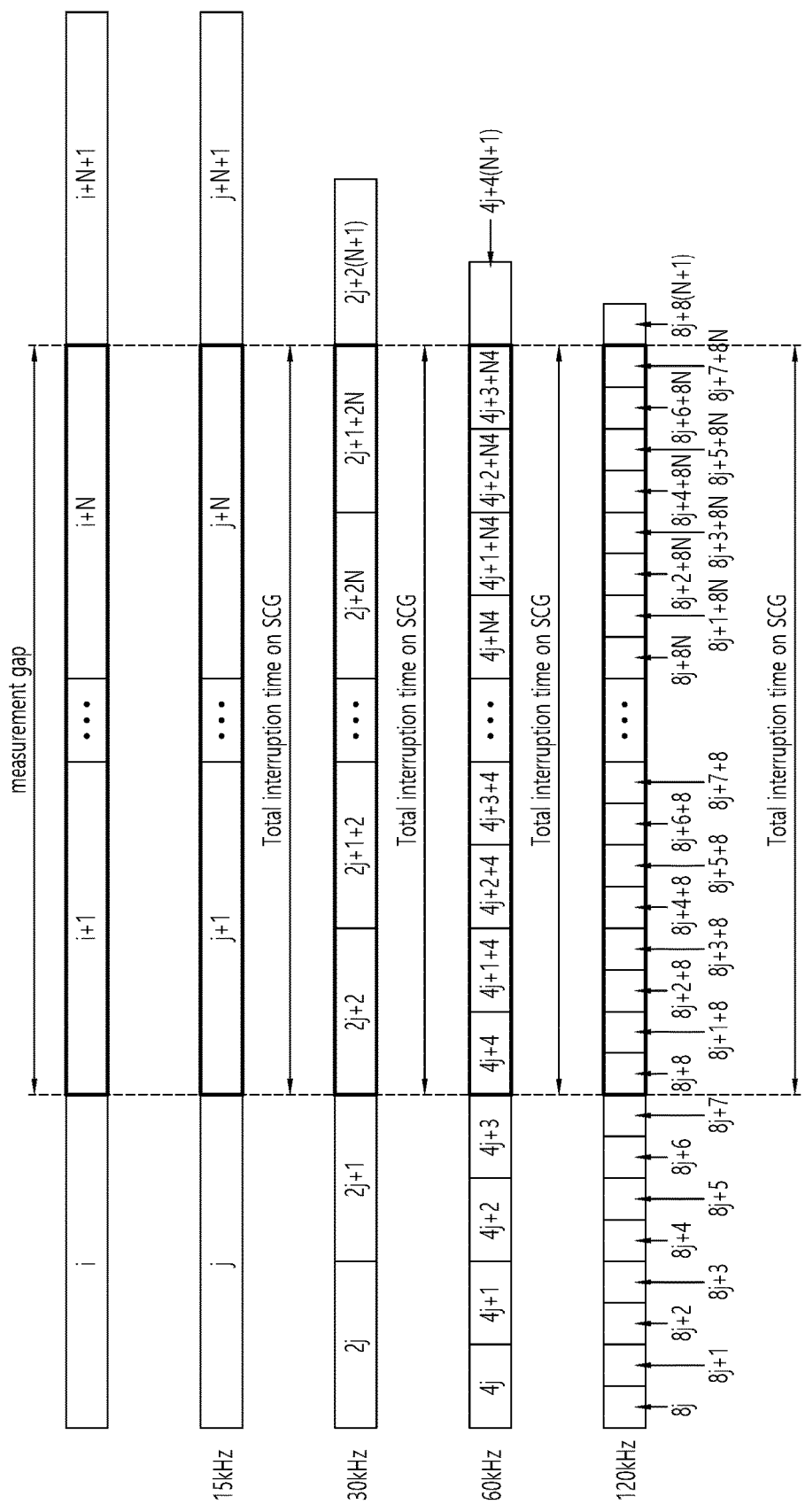
FIGS. 11A and 11B illustrate MG and total interruption time for synchronous EN-DC.
Figure 11B:
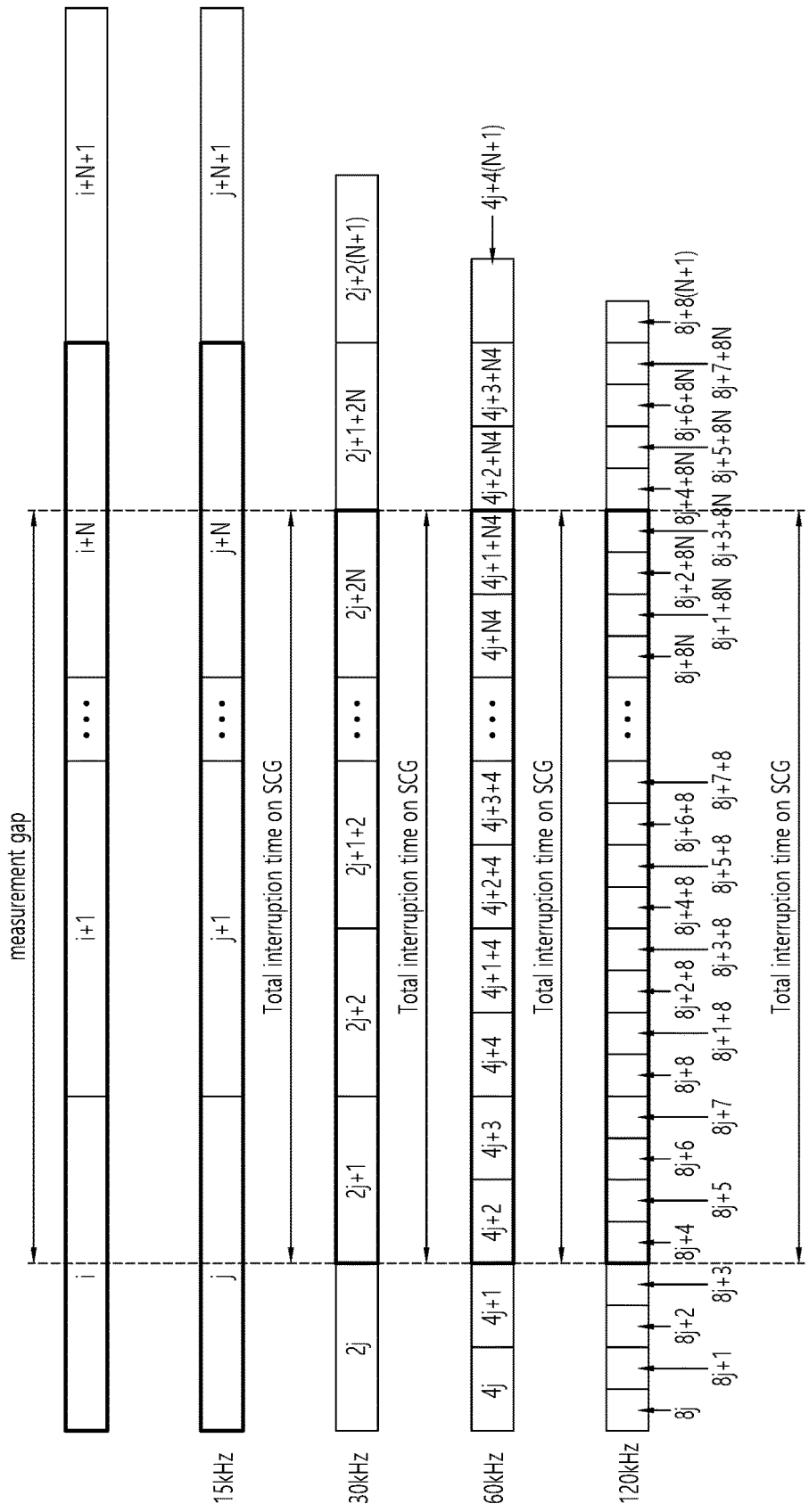
Figure 11C:
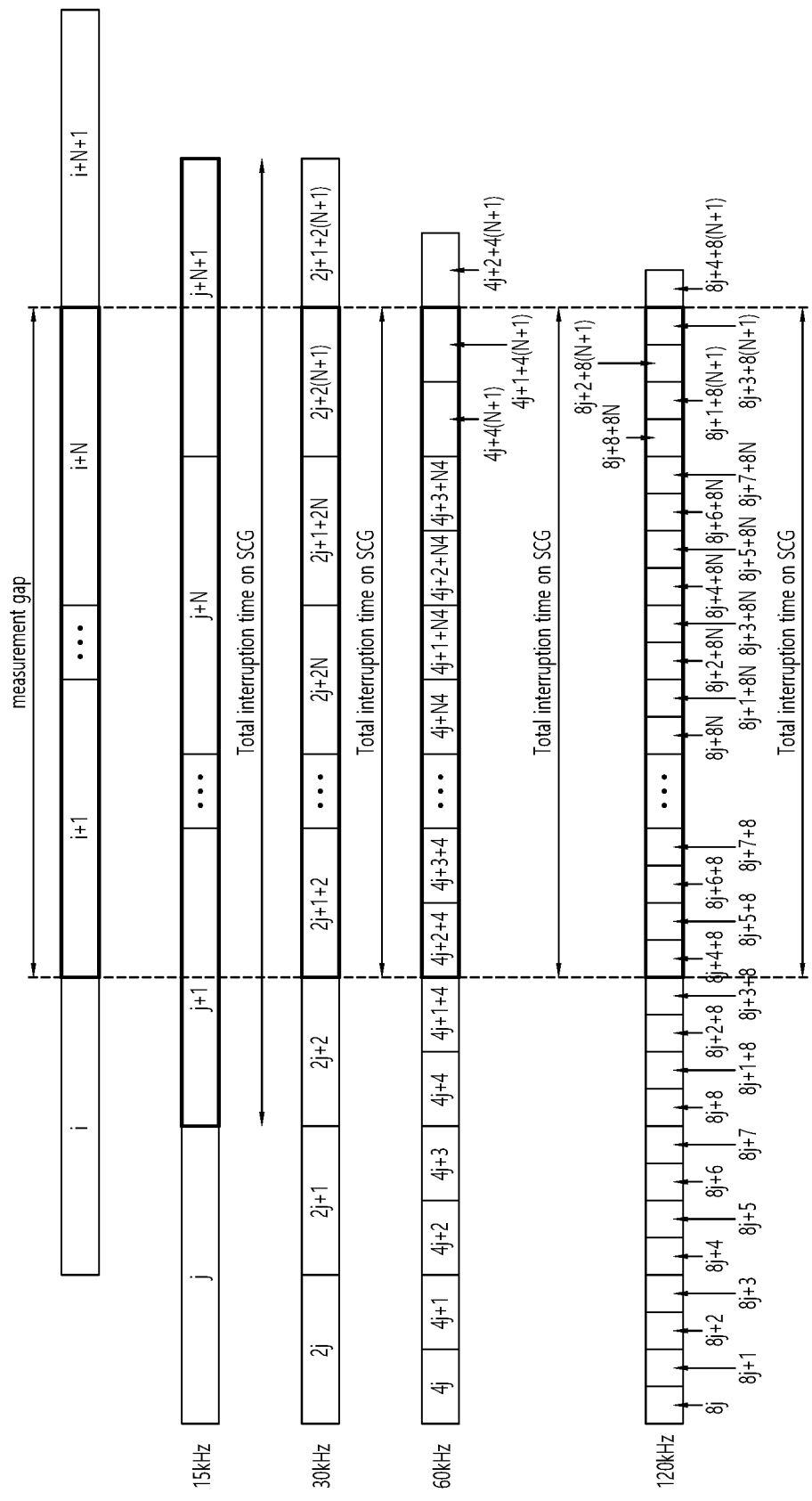
FIGS. 11C and 11D illustrate MG and total interruption time for asynchronous EN-DC according to the present invention.
Figure 11D:
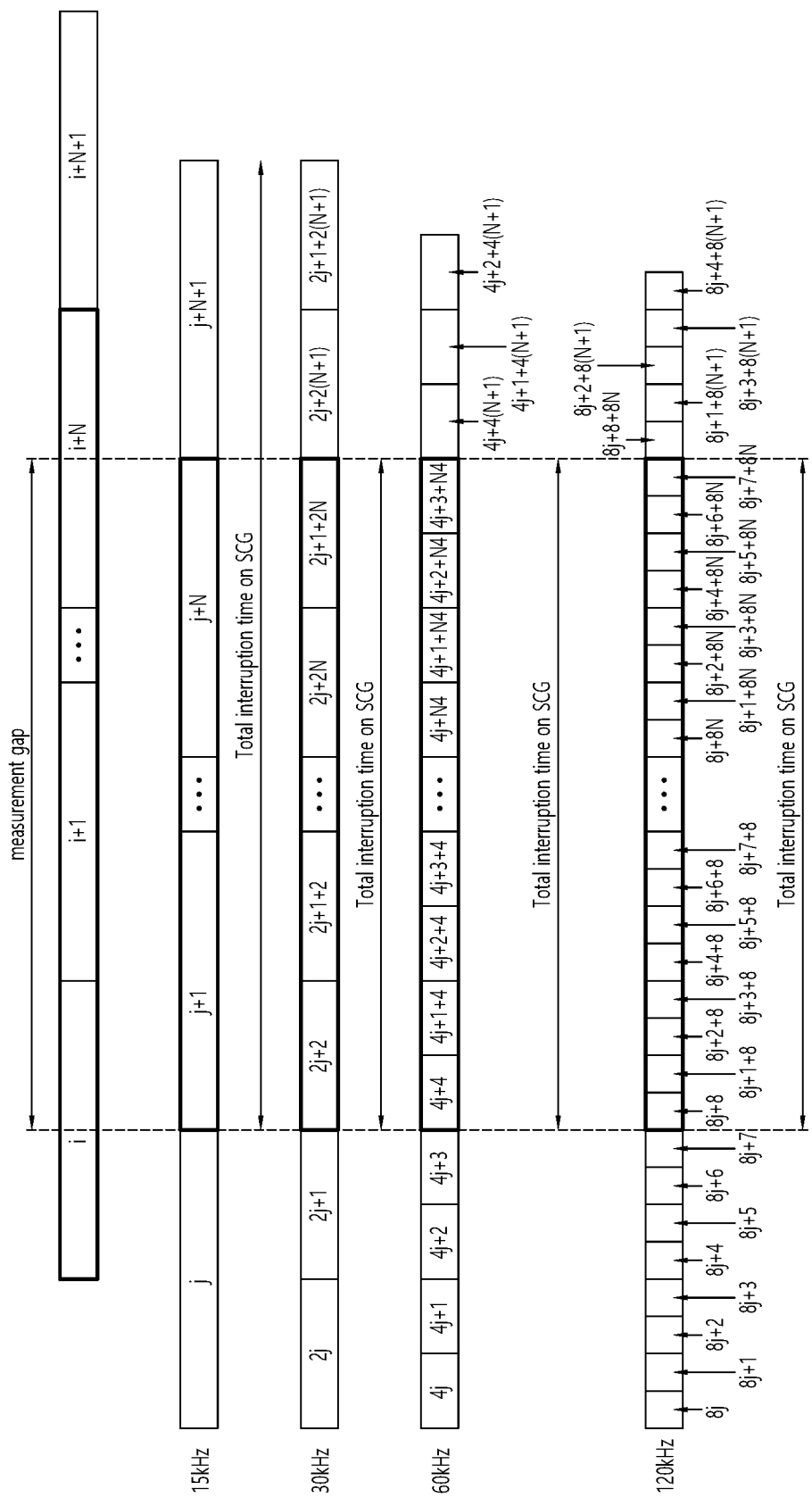

FIGS. 11A and 11B illustrate MG and total interruption time for synchronous EN-DC, and FIGS. 11C and 11D illustrate MG and total interruption time for asynchronous EN-DC according to the present invention.

FIG. 11A illustrates MG with MGL=N (ms) & without 0.5 ms shift for synchronous EN-DC, and FIG. 11B illustrates MG with MGL=N (ms) & with 0.5 ms shift for synchronous EN-DC.

And FIG. 11C illustrates MG with MGL=N (ms) & without 0.5 ms shift for asynchronous EN-DC, and FIG. 11D illustrates MG with MGL=N (ms) & with 0.5 ms shift for asynchronous EN-DC.

Referring to FIGS. 11A, 11B, 11C and 11D, for E-UTRA-NR dual connectivity, if UE is not capable of per-FR-gap, total interruption time on SCG during MGL is defined only when MGL (N)=6 ms, 4 ms and 3 ms. And if the UE supporting EN-DC is configured with PSCell, during the total interruption time as shown in FIGS. 11A, 11B, 11C and 11D, the UE shall not transmit and receive any data in SCG.

The corresponding total number of interrupted slot on SCG during MGL is listed in Table 13 for synchronous EN-DC and Table 14 for asynchronous EN-DC. The number of interrupted slot may be pre-configured in the UE.

TABLE 13

| NR SCS | Total number of interrupted slot on SCG | | | | | |
|---|---|---|---|---|---|---|
| | MG offset shift = 0 ms | | | MG offset shift = 0.5 ms | | |
| (kHz) | MGL = 6 ms | MGL = 4 ms | MGL = 3 ms | MGL = 6 ms | MGL = 4 ms | MGL = 3 ms |
| 15 | 6 | 4 | 3 | 7 | 5 | 4 |
| 30 | 12 | 8 | 6 | 12 | 8 | 6 |
| 60 | 24 | 16 | 12 | 24 | 16 | 12 |
| 120 | 48 | 32 | 24 | 48 | 32 | 24 |

Note:

For Gap Pattern ID 0, 1, 2 and 3, total number of interrupted subframe on MCG is same as that of interrupted slot on SCG in NR SCS of 15 kHz for both MG offset shift = 0 ms and 0.5 ms.

TABLE 14

| NR SCS | Total number of interrupted slot on SCG | | | | | |
|---|---|---|---|---|---|---|
| | MG offset shift = 0 ms | | | MG offset shift = 0.5 ms | | |
| (kHz) | MGL = 6 ms | MGL = 4 ms | MGL = 3 ms | MGL = 6 ms | MGL = 4 ms | MGL = 3 ms |
| 15 | 7 | 5 | 4 | 6 | 4 | 3 |
| 30 | 12 | 8 | 6 | 12 | 8 | 6 |
| 60 | 24 | 16 | 12 | 24 | 16 | 12 |
| 120 | 48 | 32 | 24 | 48 | 32 | 24 |

Note:

For Gap Pattern ID 0, 1, 2 and 3, total number of interrupted subframe on MCG is 6 subframe and 3 subframe for MGL of 6 ms and 3 ms respectively for MG offset shift = 0 ms, and total number of interrupted subframe on MCG is 7 subframe and 4 subframe for MGL of 6 ms and 3 ms respectively for MG offset shift = 0.5 ms As shown in FIGS. 11A, 11B, 11C and 11D, we propose that eNB or gNG do not schedule to transmit any data in interrupted subframe(s) on E-UTRA serving cell(s) and interrupted slot(s) on NR serving cell(s). And, we propose that UE is not expected to transmit or receive any data in interrupted subframe(s) on E-UTRA serving cell(s) and interrupted slot(s) on NR serving cell(s) during MGL.

Figure 12:
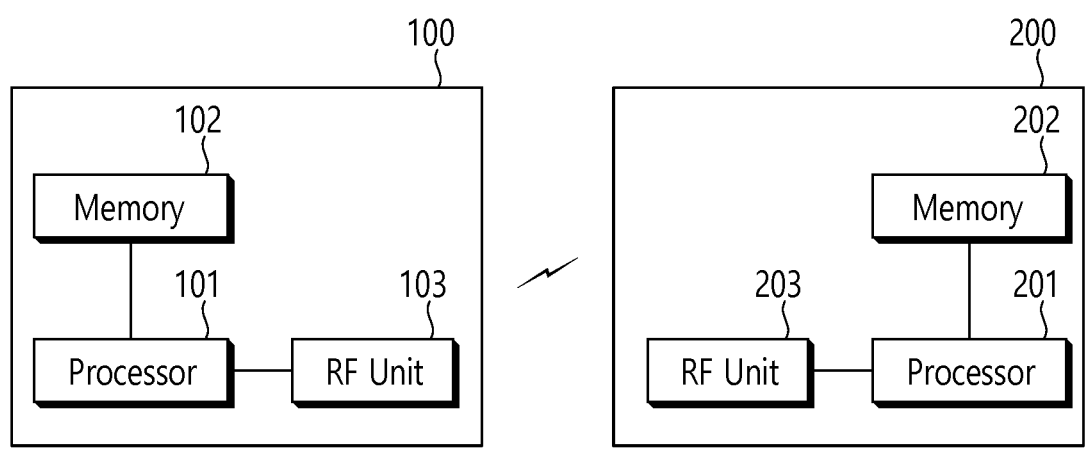
FIG. 12 is a block diagram illustrating a wireless communication system in which a disclosure of the present specification is implemented.

FIG. 12 is a block diagram illustrating a wireless communication system in which a disclosure of the present specification is implemented.

The base station 200 includes a processor 210, a memory 220, and a radio frequency (RF) unit 230. The memory 220 is connected with the processor 210 to store various pieces of information for driving the processor 210. The RF unit 230 is connected with the processor 210 to transmit and/or receive a radio signal. The processor 210 implements a function, a process, and/or a method which are proposed. In the aforementioned embodiment, the operation of the base station may be implemented by the processor 210.

UE 100 includes a processor 110, a memory 120, and an RF unit 130. The memory 120 is connected with the processor 110 to store various pieces of information for driving the processor 110. The RF unit 130 is connected with the processor 110 to transmit and/or receive the radio signal. The processor 110 implements a function, a process, and/or a method which are proposed.

The processor may include an application-specific integrated circuit (ASIC), another chip set, a logic circuit and/or a data processing apparatus. The memory may include a read-only memory (ROM), a random access memory (RAM), a flash memory, a memory card, a storage medium, and/or other storage device. The RF unit may include a baseband circuit for processing the radio signal. When the embodiment is implemented by software, the aforementioned technique may be implemented by a module (a process, a function, and the like) that performs the aforementioned function. The module may be stored in the memory and executed by the processor. The memory may be positioned inside or outside the processor and connected with the processor by various well-known means.

In the aforementioned exemplary system, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

Figure 13:
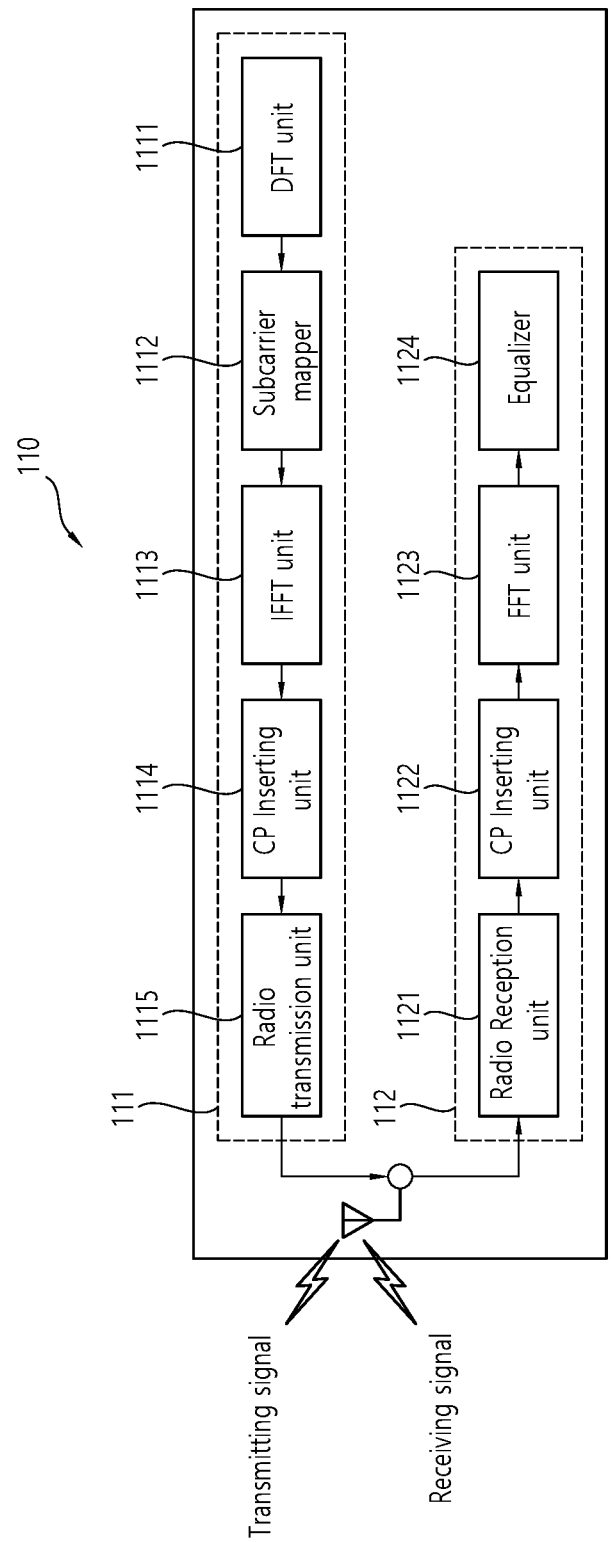
FIG. 13 is a detailed block diagram of a transceiver included in the wireless device shown in FIG. 12.

FIG. 13 is a detailed block diagram of a transceiver included in the wireless device shown in FIG. 12.

Referring to FIG. 13, the transceiver (110) includes a transmitter (111) and a receiver (112). The transmitter (111) includes a Discrete Fourier Transform (DFT) unit (1111), a subcarrier mapper (1112), an Inverse Fast Fourier Transform (IFFT) unit (1113), a CP inserter (1114), a radio transmitter (1115). The transmitter (111) may further include a modulator. Also, for example, the transmitter (111) may further include a scramble unit (not shown), a modulation mapper (not shown), a layer mapper (not shown), and a layer permutator (not shown), and these blocks may be positioned before the DFT unit (1111). More specifically, in order to prevent an increase in the peak-to-average power ratio (PAPR), the transmitter (111) allows information to pass through the DFT unit (1111) beforehand prior to mapping a signal to a subcarrier. After performing subcarrier mapping, a signal that is spread (or precoded, in the same sense) by the DFT unit (1111) through the subcarrier mapper (1112), a signal within a time axis is generated (or created) after the processed signal passes through the Inverse Fast Fourier Transform (IFFT) unit (1113).

The DFT unit (1111) performs DFT on the inputted symbols, thereby outputting complex number symbols (complex-valued symbols). For example, if Ntx symbols are inputted (wherein Ntx is an integer), a DFT size is equal to Ntx. The DFT unit (1111) may also be referred to as a transform precoder. The subcarrier mapper (1112) maps the complex number symbols to each subcarrier of the frequency domain. The complex number symbols may be mapped to resource elements corresponding to resource blocks being assigned for data transmission. The subcarrier mapper (1112) may also be referred to as a resource element mapper. The IFFT unit (1113) performs IFFT on the inputted symbols, thereby outputting a baseband signal for data, which correspond to a time domain signal. The CP inserter (1114) duplicates (or copies) an end part of the baseband signal for the data and inserts the duplicated part to a front part of the baseband signal for the data. By performing CP insertion, Inter-Symbol Interference (ISI) and Inter-Carrier Interference (ICI) may be prevented, thereby allowing orthogonality to be maintained even in a multi-path channel.

Meanwhile, the receiver (112) includes a radio receiver (1121), a CP remover (1122), a Fast Fourier Transform (FFT) unit (1123), and an equalizer (1124). The radio receiver (1121), the CP remover (1122), and the FFT unit (1123) of the receiver (112) respectively perform the inverse functions of the radio transmitter (1115), the CP inserter (1114), and the IFFT unit (1113) of the transmitter (111). The receiver (112) may further include a demodulator.

What is claimed is:

1. A method of transmitting/receiving signals by a terminal supporting E-UTRA (Evolved Universal Terrestrial Radio Access)-NR (New Radio) Dual Connectivity (EN-DC), the method comprising:
   determining a number of interrupted slots; and
   transmitting or receiving the signals based on the number of interrupted slots,
   wherein the signals are not transmitted or received during the interrupted slots,
   wherein the number of interrupted slots is determined based on subcarrier spacing (SCS) of cell supporting the NR, a measurement gap (MG) offset shift, and a MG length (MGL), and
   wherein the number of interrupted slots is 7 when the SCS is 15 kHz, the MG offset shift is 0.5 ms, and the MGL is 6 ms.

2. The method of claim 1, wherein the number of interrupted slots is 5 when the SCS is 15 kHz, the MG offset shift is 0.5 ms, and the MGL is 4 ms.

3. The method of claim 1, wherein the number of interrupted slots is 4 when the SCS is 15 kHz, the MG offset shift is 0.5 ms, and the MGL is 3 ms.

4. The method of claim 1, wherein the EN-DC is synchronous EN-DC.

5. A terminal for transmitting/receiving signals, the terminal supporting E-UTRA (Evolved Universal Terrestrial Radio Access)-NR (New Radio) Dual Connectivity (EN-DC) and comprising:
   a transceiver configured to transmit or receive the signals; and
   a processor configured to control the transceiver and determine a number of interrupted slots, wherein the processor controls the transceiver not to transmit or receive the signals during the interrupted slots, wherein the number of interrupted slots is determined based on subcarrier spacing (SCS) of cell supporting the NR, a measurement gap (MG) offset shift, and a MG length (MGL), wherein the number of interrupted slots is 7 when the SCS is 15 kHz, the MG offset shift is 0.5 ms, and the MGL is 6 ms.

6. The method of claim 5, wherein the number of interrupted slots is 5 when the SCS is 15 kHz, the MG offset shift is 0.5 ms, and the MGL is 4 ms.

7. The method of claim 5, wherein the number of interrupted slots is 4 when the SCS is 15 kHz, the MG offset shift is 0.5 ms, and the MGL is 3 ms.

8. The method of claim 5, wherein the EN-DC is synchronous EN-DC.

* * * * *